United States Patent [19]

Schermer

[11] Patent Number: 5,237,444
[45] Date of Patent: Aug. 17, 1993

[54] OPTICAL SCANNING SYSTEM
[75] Inventor: Mack J. Schermer, Belmont, Mass.
[73] Assignee: General Scanning, Inc., Watertown, Mass.
[21] Appl. No.: 905,011
[22] Filed: Jun. 26, 1992
[51] Int. Cl.[5] .............................................. G02B 26/08
[52] U.S. Cl. ..................................... 359/202; 359/221
[58] Field of Search ............... 359/201, 202, 196, 221; 250/235, 236; 358/489, 493, 494

[56] References Cited

U.S. PATENT DOCUMENTS

| 4,283,145 | 8/1981 | Miyazawa | 359/201 |
|---|---|---|---|
| 4,307,930 | 12/1981 | Saito | 359/201 |
| 4,525,749 | 6/1985 | Maeda et al. | 358/489 |
| 4,750,045 | 6/1988 | Ohara et al. | 358/494 |
| 4,797,749 | 1/1989 | Paulsen | 358/302 |
| 4,838,632 | 6/1989 | Manian | 359/221 |
| 5,150,249 | 9/1992 | Montagu | 359/202 |

OTHER PUBLICATIONS

Joseph Cohen-Sabban, Yael Cohen-Sabban, and Andre Roussel, "Distortion-free 2-D Space and Surface Scanners Using Light Deflectors", Dec. 15, 1983, vol. 22, No. 24, *Applied Optics* pp. 3925-3942.

*Primary Examiner*—Loha Ben
*Attorney, Agent, or Firm*—Cesari and McKenna

[57] ABSTRACT

In a scanner system (10) in which two scanners (14 and 16) deflect light from a laser (12) in orthogonal directions along a cylindrical object surface (18), the light from the laser is focused by a combination of an image-forming lens (24) disposed between the laser (12) and the first scanner (14) and a negative field-flattening lens (28) disposed between the two scanners (14 and 16) so as to compensate the effective focal length for the change in light-path length that results from deflection by the first scanner (14).

4 Claims, 1 Drawing Sheet

OPTICAL SCANNING SYSTEM

BACKGROUND OF THE INVENTION

The present invention concerns optical scanners.

A scanner employs a mirror or other deflecting device that receives light from a stationary source and deflects it to cause a resultant moving light spot on an object surface. (It can also be used reciprocally, to collect light from a moving object spot and direct it to a stationary detector. In most of the description below, only the stationary-source organization will be discussed, but those skilled in the art will recognize that the invention is equally applicable to reciprocal arrangements, as well as to combinations of the two arrangements.)

In one type of optical scanning system, a source, such as a laser, shines light toward a first scanning mirror, which is pivoted about a first axis and reflects the light to a second scanning mirror, which is pivoted about a second axis substantially orthogonal to the first, and the light is thereby directed to an object spot in an object surface to be scanned. The angular positions of the two mirrors respectively determine the spot's x and y coordinates on the object surface.

The typical system further includes an objective lens in the resultant path, which focuses the light to a small object point on the object surface, thereby yielding high system resolution.

One of the problems posed by this arrangement is that its geometry results in different light-path lengths for different object points in an object plane. As a consequence, if the objective is a fixed-focal-length lens, a beam that is in focus at one object point will tend to be out of focus at other object points, and system resolution accordingly suffers.

Another difficulty posed by the geometry is the interaction between the two scanning mirrors. Because the distance from the second mirror to the object plane varies with that mirror's angular position, the amount of deflection of the target spot for a given angular position of the first mirror varies with the angular position of the second mirror, and this tends to result in so-called "pincushion" distortion of the resultant raster if no steps are taken to eliminate that effect.

Among the proposals for dealing with these problems is that contained in U.S. Pat. No. 4,750,045 to Ohara et al. Instead of employing a planar object surface, Ohara et al. employ an object surface substantially in the form of a cylinder section whose axis coincides with the pivot axis of the second mirror. This eliminates the path-length variation that results from the second mirror's pivoting, and it thereby eliminates pin-cushion distortion of the resultant raster. The cylindrical shape does not eliminate the path-length effects of the first mirror's pivoting, but Ohara et al. deal with this problem by placing between the two mirrors an objective of the field-flattening type, i.e., one whose focal length so varies with the angle at which light hits it that it compensates for the path-length change through a limited range of first-mirror pivot angles.

Unfortunately, this approach depends greatly on the imaging lens, which is ordinarily required to be a compound lens—typically, an f-θ lens—of a relatively large number of elements if the field flattening is to be achieved satisfactorily through a reasonable range of angles.

SUMMARY OF THE INVENTION

I have been able to achieve the required field flattening in such a cylindrical-object-surface arrangement without such stringent requirements on the lenses employed. I have achieved this by employing a relatively simple imaging lens between the source and the first deflector and then employing a field-flattening negative lens between the first deflector and the object surface. By separating the imaging and field-flattening functions in this manner, I am able to employ lenses that are considerably simpler than the lens needed in the Ohara et al. arrangement. This approach of separating the imaging and field-flattening properties is similarly beneficial in one-dimensional scanner systems, in which the "first" deflector is the only deflector in the system.

BRIEF DESCRIPTION OF THE DRAWING

These and further features and advantages of the present invention are described below in connection with the accompanying drawing, in which.

DETAILED DESCRIPTION OF AN ILLUSTRATIVE EMBODIMENT

Figure 1:
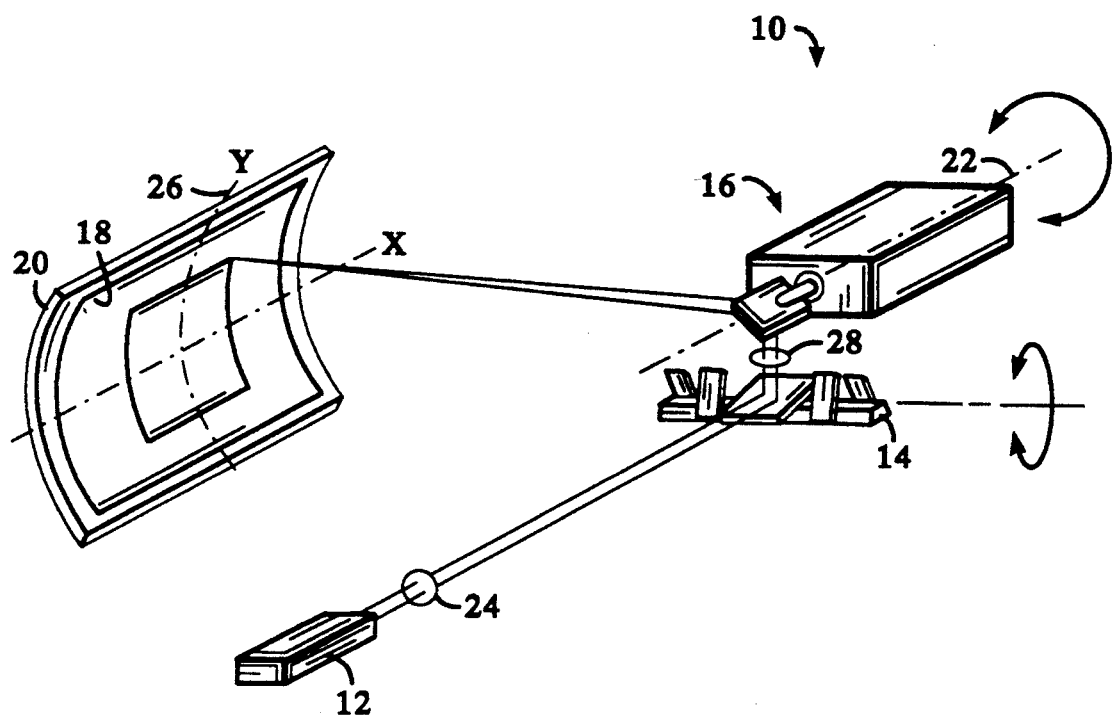
FIG. 1 is a simplified isometric view of a scanner system that employs the teachings of the present invention.

The optical scanning system 10 depicted in FIG. 1 includes a laser 12 whose output is modulated with imaging data by means not shown. Scanners 14 and 16 deflect the light from the laser 12 so as to cause it to follow a varying optical path to various object points on, say, photographic film 18 held in a holder 20 in the shape of a partial cylinder. The second scanner pivots its mirror about an axis 22 that substantially coincides with the cylinder axis. As a consequence, deflection by the second scanner 16 causes no change in the length of the path that the light travels.

Inspection of the geometry of FIG. 1 reveals that the same is not true of pivoting by the first scanner 14. As a consequence, if the simple, single-focal-length imaging lens 24 were the only refracting element in the system, then a beam in focus at, say, the y axis 26 on the image surface would fall increasingly out of focus as it is deflected in the x direction from that axis.

This loss of focus is avoided throughout a large range of x-axis deflections, however, because of a second lens 28 disposed between the first scanner 14 and the object plane 18. Lens 28 is a negative lens: it forms no real image, and the combination of it with the imaging lens 24 has a focal length greater than that of lens 24 alone. Of most importance to the present application, however, is that lens 28 is designed to have field-flattening properties. That is, the distance from the lens to the focused spot so varies with the angle at which light hits it that the variation with x-axis object-point position of the distance, if any, between the object surface and the focal point is reduced, so the beam tends to remain in focus through a relatively wide range of x positions. (The field-flattening properties of all lenses designed for field-flattening purposes are limited in angular range to a greater or lesser extent, but any lens designed for field flattening will be effective through an angular range of at least 10°, or ±5° from a rest position.)

As was indicated above, the Ohara et al. arrangement yields a similar result by using a single lens that performs the imaging and field flattening both. But the result is achieved at the expense of a more complicated—and thus more costly—lens. For the same performance, lens 28 does not need to be as complicated as the one in the Ohara et al. arrangement, because lens 28 is required only to perform the one function. It is true that the illustrated arrangement thereby requires a separate imaging lens, but that lens can be quite simple, since it needs to form an image only for axially directed light in a very small envelope. In contrast, the imaging element in the Ohara et al. arrangement must focus light from a much larger envelope and range of angles. It is thus apparent that the present invention represents a significant advance in the art.

What is claimed is:

1. An optical scanning system for scanning in a given dimension an object surface substantially linear in that dimension, comprising:
    A) a light source or detector;
    B) a first scanning deflector, defining a variable light path between the object surface and the source or detector, for, by pivoting about a first pivot axis, deflecting, in the given dimension, an object point at which the light path meets the object surface;
    C) an image-forming lens disposed in the light path between the source or detector and the first deflector; and
    D) a negative lens disposed between the first deflector and the object surface and having a field-flattening characteristic, by which the variation with object-point position of the distance between the object surface and the focal point of the combination of the image-forming lens and the negative lens is less than the variation with object-point position of the distance between the object surface and the focal point of the image-forming lens alone throughout a range of deflector angles that exceeds 10°.

2. An optical scanning system as defined in claim 1 wherein:
    A) the object surface has substantially the form of a segment of a cylinder having a cylinder axis; and
    B) the system further includes a second deflector, disposed in the light path between the first deflector and the object surface, for, by pivoting about a second pivot axis substantially coincident with the cylinder axis, deflecting the object point generally in planes perpendicular to the cylinder axis.

3. An optical scanning system as defined in claim 2 wherein the negative lens is disposed in the optical path between the first and second deflectors.

4. A scanning system as defined in claim 1 further including a holder for so supporting a sheet that a surface of the sheet forms the object surface.

* * * * *